Patented May 20, 1947

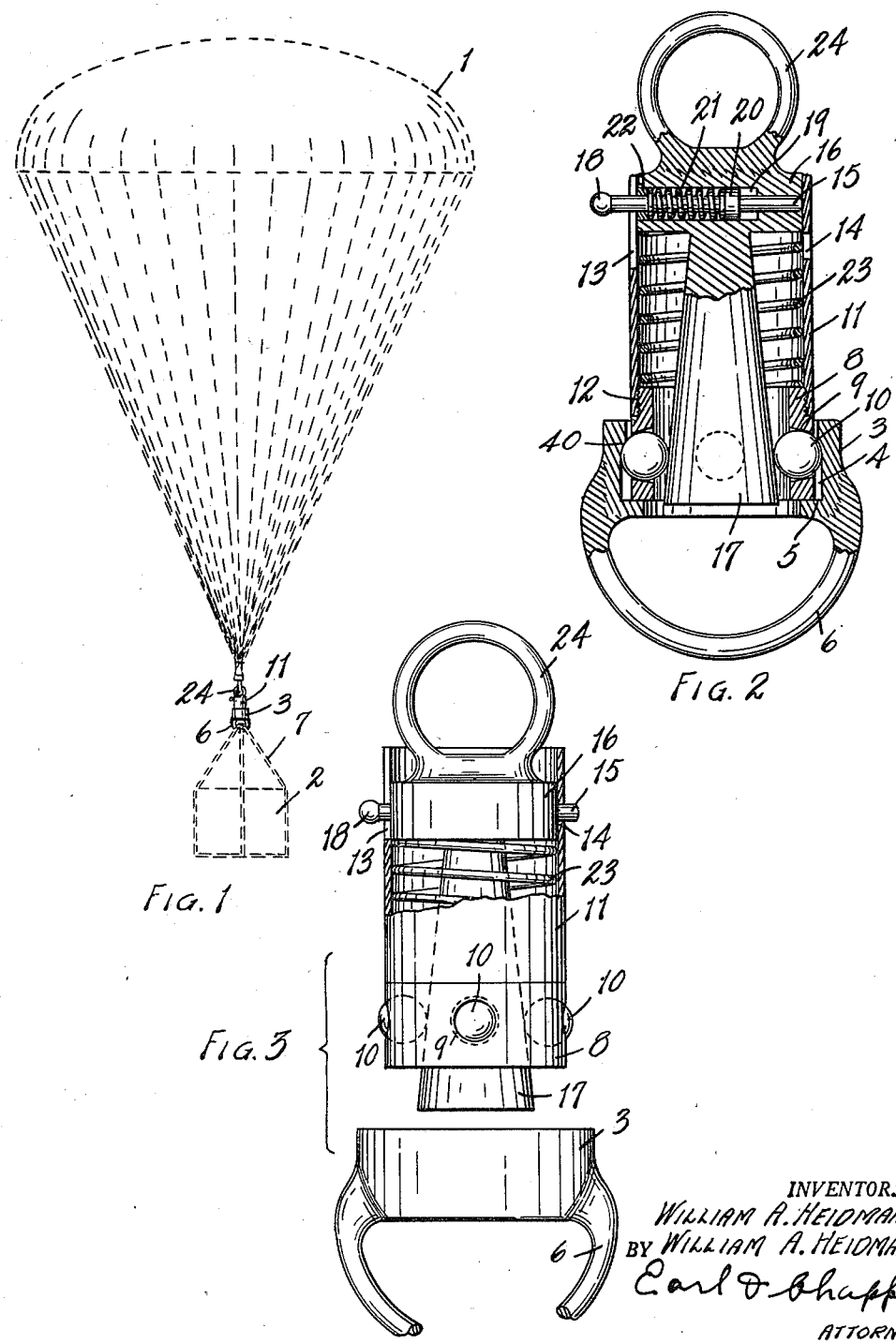

2,420,746

UNITED STATES PATENT OFFICE 2,420,746

AUTOMATIC LOAD RELEASING COUPLING OR CLUTCH FOR PARACHUTES AND THE LIKE

William A. Heidman and William A. Heidman, Jr., Grand Rapids, Mich.

Application February 28, 1945, Serial No. 580,192

13 Claims. (Cl. 294—83)

This invention relates to improvements in automatic load releasing couplings or clutches for parachutes and the like.

The main objects of this invention are:

First, to provide an automatically acting load releasing coupling or clutch for parachutes and the like which effectively sustains the load and one in which the clutch remains effectively engaged through varying conditions of shifting or changing of the relationship of the load and relative to the parachute or vice versa and is not affected by sudden jerks or stresses such as might occur from the varying of the position of the parachute resulting from air currents, air pockets, and the like.

Second, to provide a load releasing clutch of the class indicated which is automatically released when the load strikes the ground thereby freeing the load from the parachute and preventing the dragging of the load over the ground by the parachute with a consequent liability of injury to the load.

Third, to provide an automatic load releasing clutch which is easily engaged and one in which the clutch elements are retained in engaging position by the sustaining stress of the parachute as opposed to the weight of the load.

Fourth, to provide a structure having these advantages in which the clutch or coupling elements are very easily engaged and the weight of the load acts to tighten the clutch, the clutch however being quickly released on being subjected to impacts such as result from the clutch or coupling striking the load when the weight of the load is released as by the load engaging or contacting the ground.

Fifth, to provide a structure having these advantages which is very economical to produce and one in which the coacting clutch members may be repeatedly used with the same or similar coacting elements.

Objects relating to details and economies of the invention will appear from the description to follow. The invention is defined and pointed out in the claims.

A preferred embodiment of the invention is illustrated in the accompanying drawing, in which:

Fig. 1 is a side elevation of an automatic load releasing clutch or coupling embodying our invention in operative relation to a load shown by dotted lines and to a parachute also shown by dotted lines, the parts being in engaged or clutch position.

Fig. 2 is a fragmentary view mainly in longitudinal section of an automatic load releasing coupling or clutch embodying our invention.

Fig. 3 is a fragmentary view partially in section with the clutch members disengaged or separated.

In the accompanying drawing, 1 represents a parachute and 2 a load. Our improved automatic load releasing clutch or coupling is designed to constitute a coupling connecting the parachute to the load.

The embodiment of our invention illustrated comprises an outer annular clutch member 3 having an internal cylindrical recess 4 and provided with an annular seat 5 at the inner end of the recess. The clutch member 3 is provided with an eye 6 adapted to receive the load attaching sling members 7. These of course vary in accordance with the load and also with the views of the user or specifications as to use.

The inner clutch member 8 is loosely received within the outer clutch member designed to seat on the seat 5 of the outer clutch member. The inner clutch member is provided with a plurality of outwardly tapered sockets 9, four being provided in the structure illustrated, these sockets being adapted to receive the clutch balls 10. These sockets are of such diameter as to permit the balls to project therethrough into engagement with the cylindrical recess 4 of the outer clutch member as shown in Fig. 2. The cylindrical recess results in a shoulder 40 at the outer end of the recess preferably curved as illustrated. The diameter of these sockets however at their outer ends is such as to prevent the passage of the balls therethrough when the clutch members are separated as shown in Fig. 3.

The outer clutch member is provided with a cylindrical casing or barrel portion 11 preferably engaged with the clutch portion proper of the inner member by means of threads shown at 12 but the connection should be such that the parts are not likely to become accidentally separated.

The casing portion 11 of the inner clutch member is provided with a longitudinal slot 13 at its outer end and with a hole 14 diametrically opposite the slot, the hole providing a keeper adapted to receive the latch bolt 15.

The latch bolt 15 is carried by the head 16 of the tapered or conical clutch control member 17. This control member extends between the balls or equivalent clutch elements 10 and is adapted when in the position shown in Fig. 2 to hold them in clutching engagement with the outer clutch member. However, when the control member is retracted to the position shown in Fig. 3 the clutch elements 10 may be moved inwardly to disengaged position thereby disengaging the clutch members and allowing separation thereof.

The bolt detent 15 projects through the slot 13 and is provided with a finger piece 18 at its outer end.

The control member has a transverse bore 19 in its head portion, the bolt being arranged longitudinally through this bore and being provided with a thrust member 20 engaged by the coiled spring 21 arranged within the bore and supported at its outer end by the plug 22 in the outer end of the bore. The spring acts to urge the detent toward engaging position so that when the control member 17 is in its retracted position, as shown in Fig. 3, the detent automatically engages in the keeper opening 14.

The control member is yieldably urged or biased to clutch engaging position by means of the coiled spring 23 arranged between the head of the control member and the shoulder provided by the end of the clutch member 3—that is, the clutch portion thereof. This spring is of sufficient strength or tension as to yieldingly support the clutch members in their engaged position.

The control member is provided with an eye 24 to which the parachute is attached so that the sustaining pull or stress of the parachute in counteracting the weight or load on the clutch member 3 is on the control member.

In connecting the parachute to the load, the load is connected to the eye 6, as stated, the inner clutch member inserted, then the outer clutch member and the detent disengaged from the keeper, allowing the spring 23 to actuate the control member to clutch engaging position as shown in Fig. 2. The parachute being attached to the eye 24 results in the stress or load on the coupling acting to urge the clutch parts into engaging position. However, when the load strikes the ground the outer clutch member will strike the load or the ground depending on the connection and the impact thus resulting will force the control member axially against the tension of the spring 23 thereby releasing the clutch members. While the spring 23 is designed to maintain the clutch parts in engaged position the mass or weight of the control element is such that with an impact, such as would result from the arresting of the downward or falling movement of the coupling, overcomes the biasing spring and relationship of the clutch.

With the parts thus arranged there is no possibility of the clutch parts becoming prematurely disengaged as gravity cannot bring the clutch or coupling element into engagement with the load with such force as to result in releasing the clutch and while the sustaining stress of the parachute may be very greatly varied as a result of air currents, air pockets, and the like, the coupling clutch remains engaged until the load has contacted the ground when it is quickly released.

The parts may be repeatedly used if desired. However, the main aim is to provide a load releasing clutch coupling in which the parts may be easily engaged and attached to the load and the parachute or other sustaining object and one which is positive in its relation when the load contacts the ground, at the same time is not likely to release under other conditions.

We have illustrated and described an embodiment of our invention which we consider as being highly practical both from the manufacturing and use standpoints. We have not however attempted to illustrate or describe certain modifications and adaptations which we contemplate as we believe the disclosure will enable those skilled in the art to embody or adapt our invention as may be desired.

Having thus described our invention, what we claim as new and desire to secure by Letters Patent is:

1. An automatic load releasing clutch for parachutes and the like comprising an outer annular clutch member having an internal cylindrical recess and provided with an eye facilitating attachment to a load, an inner annular clutch member loosely received within said outer clutch member and having a plurality of peripherally spaced outwardly tapered sockets, said outer clutch member having a seat for said inner clutch member, said inner clutch member having a cylindrical casing portion provided with a longitudinal slot and with a keeper diametrically opposite said slot, clutch balls arranged in said sockets, the diameter of the outer ends of said sockets being such as to permit the balls to project therethrough into clutching engagement with the outer clutch member while retaining the balls, a conical clutch member coacting with said balls and adapted when in its outer position to hold the balls in clutching engagement with the outer clutch member and permitting their disengagement when in its inner position, said control member being provided with a head slidable within said casing and provided with an eye facilitating attachment to a parachute or the like so that the resistance to the load is on the control member, a spring biased detent bolt slidably mounted in said head transversely thereof to project through said slot in said casing and adapted to automatically engage said keeper when the control member is in clutch releasing position, and a coiled spring arranged within said casing to bias said control member to clutch engaging position, the tension of the spring being sufficient to normally support the weight of the control member and hold it in clutch engaging position, the weight of the control member being such as to overcome the spring when the clutch is subjected to a substantial axial impact thereby releasing the clutch.

2. An automatic load releasing clutch for parachutes and the like comprising an outer annular clutch member having an internal cylindrical recess and provided with an eye facilitating attachment to a load, an inner annular clutch member loosely received within said outer clutch member and having a plurality of peripherally spaced outwardly tapered sockets, said outer clutch member having a seat for said inner clutch member, said inner clutch member having a cylindrical casing portion provided with a keeper, clutch balls arranged in said sockets, the diameter of the outer ends of said sockets being such as to permit the balls to project therethrough into clutching engagement with the outer clutch member while retaining the balls, a conical clutch member coacting with said balls and adapted when in its outer position to hold the balls in clutching engagement with the outer clutch member and permitting their disengagement when in its inner position, said control member being slidable within said casing and provided with an eye facilitating attachment to a parachute or the like so that the resistance to the load is on the control member, and a coiled spring arranged within said casing to bias said control member into clutch engaging position, the tension of the spring being sufficient to normally support the weight of the control member and hold it in clutch engaging position, the weight of the control member being such as to overcome the spring when the clutch is subjected to a substantial axial impact thereby releasing the clutch.

3. An automatic load releasing clutch for parachutes and the like comprising an outer clutch member adapted for attachment to a load, an inner clutch member received within said outer clutch member and having a plurality of outwardly tapered sockets, said inner clutch member having a casing portion provided with a longitudinal slot and with a keeper diametrically opposite said slot, clutch elements arranged in said sockets, the diameter of the outer ends of said sockets being such as to permit the clutch elements to project therethrough into clutching engagement with the outer clutch member while preventing their passing therethrough, a tapered control member coacting with said clutch elements and adapted when in its actuated position to hold the clutch elements in clutching engagement and permitting their disengagement when in its retracted position, said control member being provided with a head and means facilitating its attachment to a parachute or the like so that load resistance is imparted to the control member, a spring biased detent bolt slidably mounted in said control transversely thereof to project through said slot in said casing and adapted to automatically engage said keeper when the control member is in clutch releasing position, and a spring arranged within said casing to bias said control member to clutch engaging position, the spring being of sufficient strength to normally retain the control member in clutch engaging position, the weight of the control member being such as to overcome the spring when the clutch is subjected to a substantial axial impact thereby releasing the clutch.

4. An automatic load releasing clutch for parachutes and the like comprising an outer clutch member adapted for attachment to a load, an inner clutch member received within said outer clutch member and having a plurality of outwardly tapered sockets, clutch elements arranged in said sockets, the diameter of the outer ends of said sockets being such as to permit the clutch elements to project therethrough into clutching engagement with the outer clutch member while preventing their passing therethrough, a tapered control member coacting with said clutch elements and adapted when in its actuated position to hold the clutch elements in clutching engagement and permitting their disengagement when in its retracted position, said control member being provided with means facilitating its attachment to a parachute or the like so that load resistance is imparted to the control member, and a spring arranged within said casing to bias said control member to clutch engaging position, the spring being of sufficient strength to normally retain the control member in clutch engaging position, the weight of the control member being such as to overcome the spring when the clutch is subjected to a substantial axial impact thereby releasing the clutch.

5. An automatic load releasing clutch for parachutes and the like comprising an outer clutch member adapted for attachment to a load, an inner clutch member received within said outer clutch member, clutch elements carried by said inner clutch member to coact with said outer clutch member, a control member coacting with said clutch elements and adapted when in its actuated position to hold the clutch elements in clutching engagement with the outer clutch member and permitting their disengagement when in its retracted position, said control member being provided with means facilitating its attachment to a parachute or the like so that load resistance is imparted to the control member, a spring biased detent adapted to automatically engage when the control member is in clutch releasing position, and a spring arranged within said inner clutch member to bias said control member to clutch engaging position, the tension of the spring being sufficient to normally retain it in clutch engaging position, the control member being of such mass as to overcome the spring when the clutch is subjected to a substantial axial impact thereby releasing the clutch.

6. An automatic load releasing clutch of the type described comprising a clutch member adapted for attachment to a load, a coacting clutch member provided with a movable clutch element engageable with said first mentioned clutch member, a control member operatively associated with said second mentioned clutch member and having a tapered portion coacting with said clutch elements for urging them into clutch engagement with said first mentioned clutch member and permitting their disengagement on the retracting movement of the control member, said control member being adapted for attachment to a parachute or the like so that the load resistance of the parachute is imparted to the control member, and a spring arranged to bias said control member to clutch engaging position, the tension of the spring being sufficient to normally resist the weight of the control member and retain it in clutching engaging position, the weight of the control member being such as to overcome the spring when the clutch is subjected to a substantial impact axially of the control member thereby releasing the clutch.

7. An automatic load releasing coupling of the type described comprising a clutch member adapted for attachment to a load, a coacting clutch member provided with a clutch element engageable with said first mentioned clutch member, a control member operatively associated with said second mentioned clutch member in operative relation to its said clutch element, said control member being adapted for attachment to a parachute or the like so that the load resistance of the parachute is imparted to the control member, a spring arranged to bias said control member to clutch engaging position, said control member being arranged to be actuated to releasing position when it is subjected to a substantial impact thereby releasing the clutch, and a manually releasable detent adapted to automatically retain the control member in its clutch releasing position.

8. An automatic load releasing coupling of the type described comprising a clutch member adapted for attachment to a load, a coacting clutch member provided with a clutch element engageable with said first mentioned clutch member, a control member operatively associated with said second mentioned clutch member in operative relation to its said clutch element, said control member being adapted for attachment to a parachute or the like so that the load resistance of the parachute is imparted to the control member, and a spring arranged to bias said control member in a direction away from the load supported by the first mentioned clutch member to clutch engaging position to engage the clutch element with the first mentioned clutch member, said control member being arranged to be actuated against the action of said spring and towards the load supported on the first mentioned clutch member to releasing position when it is subjected to a substantial impact thereby releasing the clutch.

9. An automatic load releasing coupling of the class described comprising coacting separable clutch members one of which is adapted for attachment to a load and the other adapted to transmit the pull of the load from the first clutch member towards a parachute or the like, a clutch control member operatively associated with one of said clutch members and provided with a yielding means acting to bias it to clutch engaging position, and a detent for holding said control member in clutch releasing position against the tension of its said biasing means, said clutch control member being adapted to be actuated to clutch releasing position by impact.

10. An automatic load releasing coupling of the class described comprising coacting separable clutch members one of which is adapted for attachment to a load and the other adapted to transmit the pull of the load from the first clutch member towards a parachute or the like, a clutch control member operatively associated with one of said clutch members and provided with a yielding means acting to bias it to clutch engaging position, and a detent for holding said control member in clutch releasing position against the tension of its said biasing means, said clutch control member biasing means being adapted to yield to the inertia of said control member when the coupling is subjected to an impact such as that resulting from the falling coupling striking the load or ground.

11. An automatic load releasing coupling of the class described comprising coacting separable clutch members one of which is provided with a rollingly mounted clutch element releasably engageable with the other, and a wedge-shaped control member for wedgingly engaging said rollingly mounted clutch element and adapted when in actuated position to release the clutch element and thereby disengage the clutch, such control member constituting a load supporting coupling element between the load and its sustaining means and being actuated to disengaged position by the release of the load sustaining stress and the impact resulting from arresting of the falling movement of the coupling.

12. An automatic load releasing coupling of the class described comprising first and second coacting clutch members, a clutch control member carried by the first clutch member and provided with yielding means for acting to bias the control member to clutch engaging position, said clutch control member and the second clutch member being provided with means for connection to a load or load sustaining means, and an automatically engageable detent for holding said clutch control member in clutch disengaging position against the stress of its said biasing means, said biasing means being adapted to yield to the inertia of said control member when the coupling is subjected to impacts such as that resulting from the release of the load sustaining stress on the control member and the impact of the coupling against a load or the ground.

13. An automatic load releasing coupling of the class described comprising first and second coacting clutch members, and a clutch control member carried by the first clutch member and provided with yielding means for acting to bias the control member to clutch engaging position, said clutch control member and the second clutch member being provided with means for connection to a load or load sustaining means, said biasing means being adapted to yield to the inertia of said control member when the coupling is subjected to impacts such as that resulting from the release of the load sustaining stress on the control member and the impact of the coupling against a load or the ground.

WILLIAM A. HEIDMAN.
WILLIAM A. HEIDMAN, JR.

REFERENCES CITED

The following references are of record in the file of this patent:

UNITED STATES PATENTS

| Number | Name | Date |
| --- | --- | --- |
| 1,618,851 | Thunberg | Feb. 22, 1927 |
| 2,057,699 | Williams | Oct. 20, 1936 |
| 2,328,914 | Kubat | Sept. 7, 1943 |
| 2,368,671 | Lombard | Feb. 6, 1945 |